UNITED STATES PATENT OFFICE.

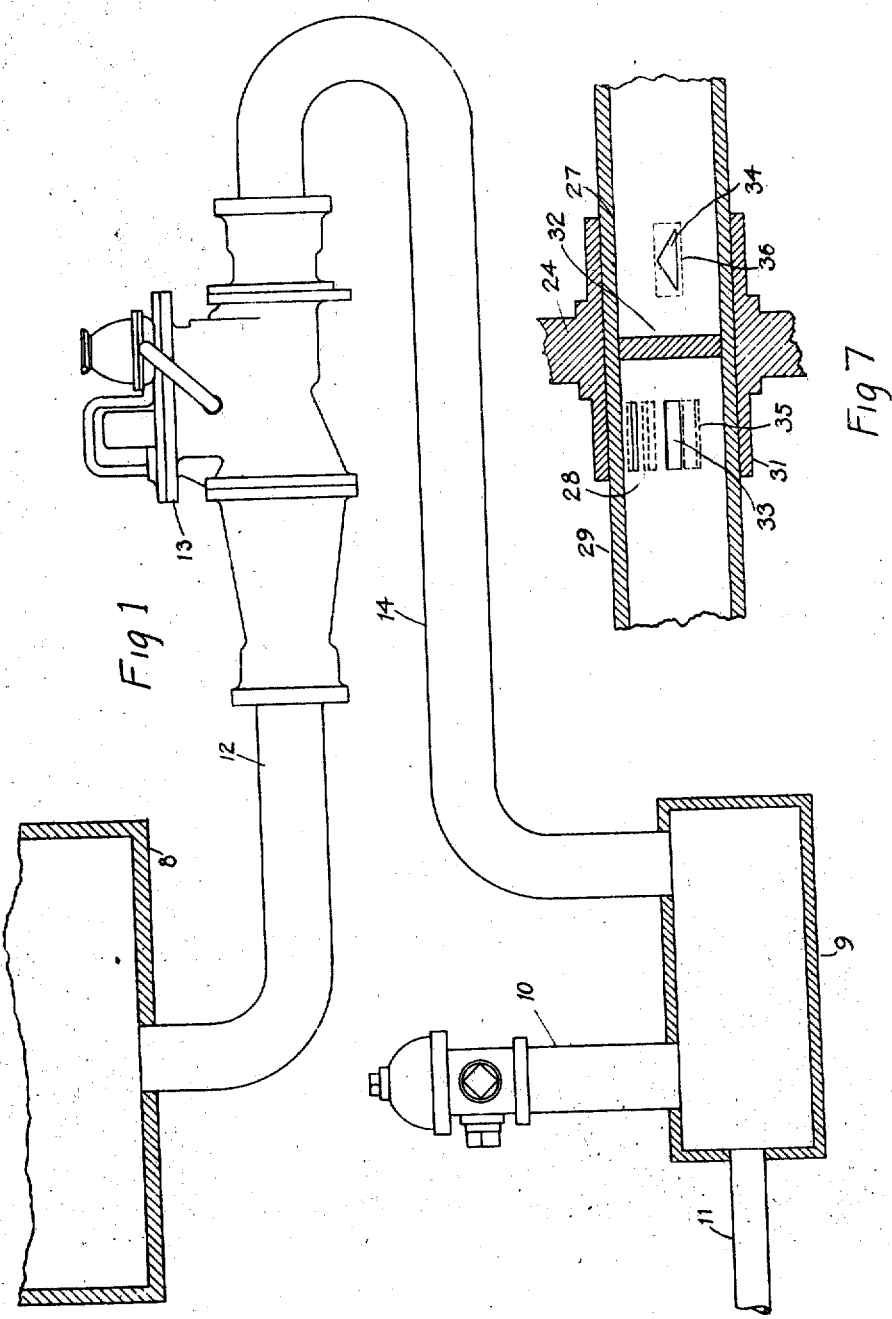

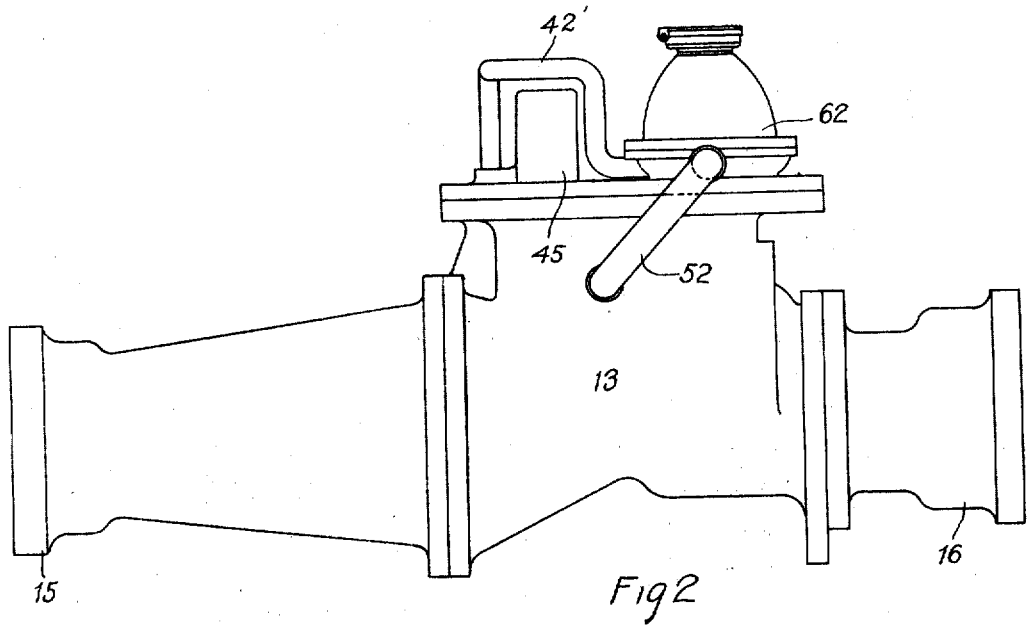
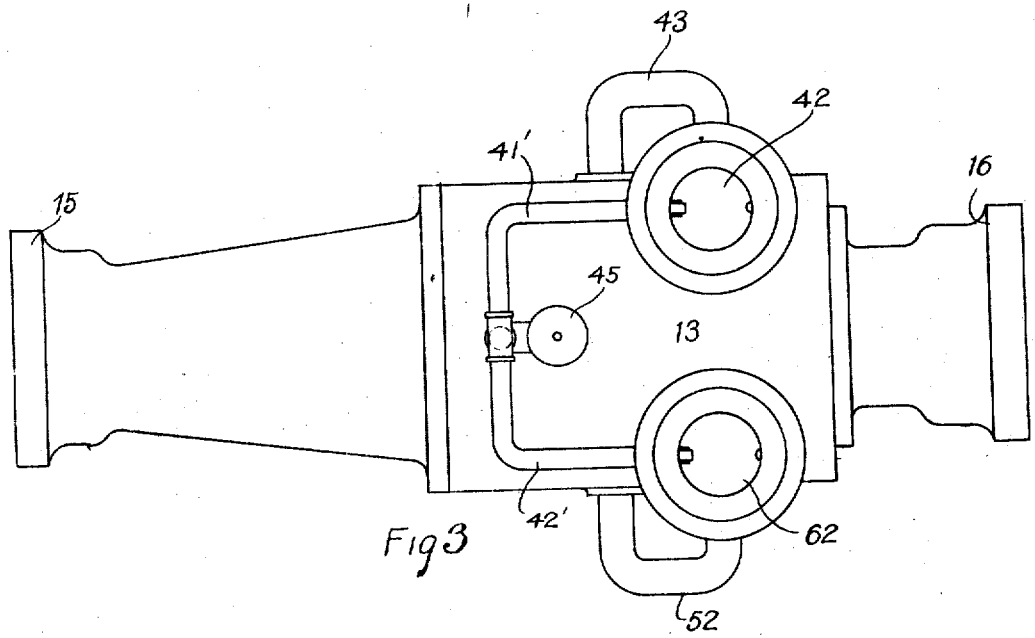

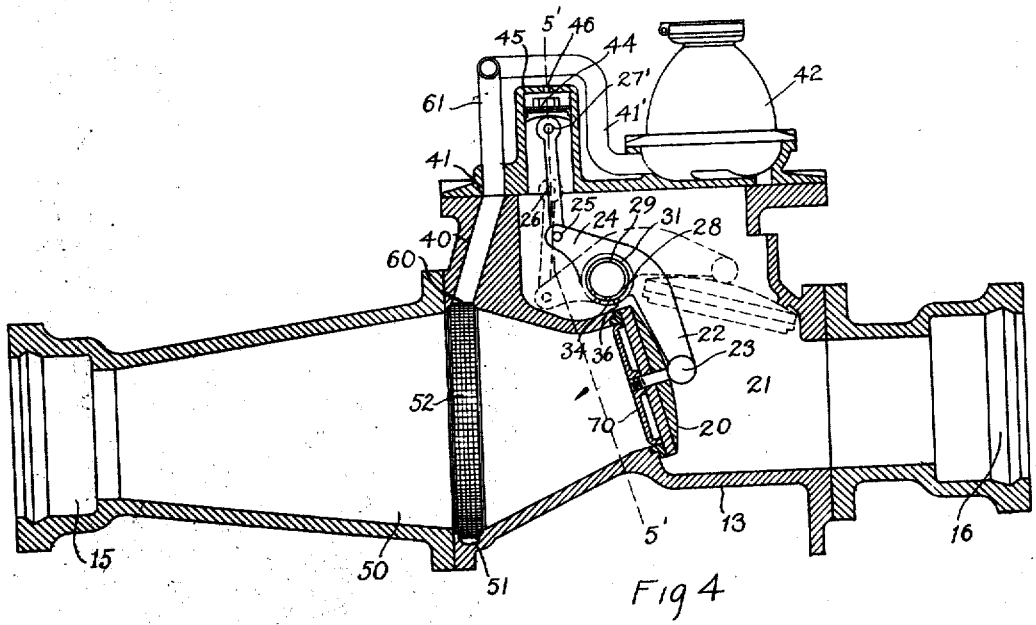
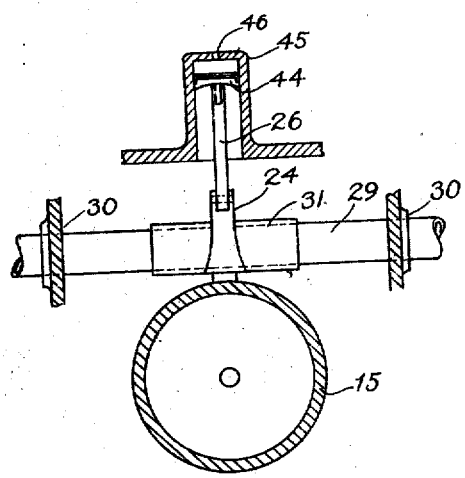
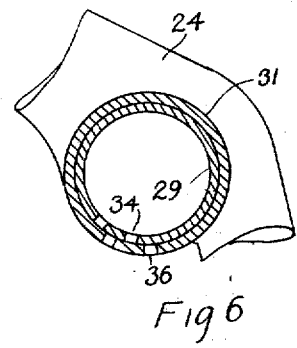

GEORGE GOODELL EARL AND ALBERT BALDWIN WOOD, OF NEW ORLEANS, LOUISIANA.

FLUID-METERING SYSTEM.

1,212,150. Specification of Letters Patent. Patented Jan. 9, 1917.

Application filed February 3, 1912. Serial No. 675,378.

*To all whom it may concern:*

Be it known that we, GEORGE G. EARL and ALBERT B. WOOD, citizens of the United States, residing at New Orleans, in the parish of Orleans and State of Louisiana, have invented certain new and useful Improvements in Fluid-Metering Systems; and we do hereby declare the following to be a full, clear, and exact description of our invention, such as will enable others skilled in the art to which it appertains to make and use the same.

The invention of this application is an improvement on the device illustrated and described in the application of George G. Earl and Albert B. Wood, #638,047, filed July 12, 1911.

In general the object of this invention is the production of mechanism for accurately measuring the flow of fluids through fluid ducts or mains.

One of the particular objects of this invention is to provide means for measuring the flow of fluids in conduits by causing a constant percentage of this flow to be accurately measured, thereby obtaining a measure of the entire flow. It is desired to do this with the least possible obstruction or loss of pressure to the main flow. Meters which aim to accomplish this result are generally inaccurate or fail to register at all on small flows, or else cause too much loss of pressure on large flows. Where it is desired under certain conditions to measure very small flows or leaks, this may be done directly by means of another meter, though this is not an essential feature of our invention. Former types of meters are likely to become obstructed by trash, and another object of our invention is to provide a meter which cannot be thus obstructed. By our invention we provide means for successfully accomplishing these results. The device of our invention also accurately measures the flow when the mechanism is changing from the condition under which the small flow passes to the condition under which the normal is to be passed.

In the invention of the application named above, the fluid to be passed through the meter is taken off at the normal pressure in the main. We have found by increasing the pressure at this point, the reading of the meter may be made more reliable, and we therefore provide means for this purpose.

Another object of the present invention is the provision of means for removing all obstructions from the passage of water through the main during the larger flow.

In the device of the above named application the couple which resisted the movement of the main valve was decreased as the valve was opened. In this invention we have reversed this condition, and this couple now increases as the valve is opened, since we find that that method is better for the particular form of invention disclosed in this application.

Other objects of our invention and the invention itself will be best understood by reference to the following description when taken in connection with the accompanying illustration, showing one specific embodiment of the invention, while its scope will be more particularly pointed out in the appended claims.

Figure 1 shows a diagram of a system with which our invention may be employed. Fig. 2 is a side elevation of the apparatus to which our invention is applied in the particular form shown. Fig. 3 is a plan view of the apparatus shown in Fig. 2. Fig. 4 is a cross-section taken through Fig. 3. Fig. 5 is a section through the lines 5' of Fig. 4. Figs. 6 and 7 are details of the apparatus shown in the other figures.

Referring now to the drawings and to the form of the invention shown therein, a source of fluid pressure, such for example as a reservoir is shown at 8. A source of pressure is shown at 9. In the particular form of our invention shown, we have illustrated at 10 a fire plug and at 11 a supply pipe, though it will be understood that these are merely illustrations, and in no way limit the invention. The sources of pressure are connected by a fluid duct or main 12, which passes through a box 13, which we prefer to employ to house the fluid controlling device. The duct or main 12 is continued at 14 to the source 9. The box or chamber 13 is provided with an entrance 15 into which the main 12 enters, and an exit opening 16, connected with the duct 14.

In the form of our invention shown, the passage of the water through the main is normally obstructed preferably by a valve 20, hereafter known as the main valve. This valve is preferably mounted in a chamber 21, inside of the box 13, and between the entrance 15 and the exit 16. The valve is mounted in the box to swing about a pivot. As shown, it is preferably pivotally connected at 23 to an arm 22, which is itself pivoted in the chamber. The valve 20 controls a pair of fluid controlling devices, such as valves, one of which is open when the other is closed, and each of which is being opened when the other is being closed. A duct 29 passes through the chamber 21, and the walls thereof at 30, 30. A hollow sleeve 31 fastened to the lever 22 is mounted over this duct and rotates with the lever so that the said lever may turn about the duct 29 as a pivot. The interior of the duct is divided by a partition 32. On one side of this partition, the walls of the duct are pierced with an opening or a plurality of openings 33, and on the other side an opening or a plurality of openings 34. The sleeve 31 is likewise pierced with corresponding openings 35 on one side of the partition and 36 on the other; the two sets 33—35 being entirely open when the valve 20 is closed and the flow is small, and the set 34—36 being entirely open when the valve is entirely open. The main is tapped at 60 and a duct 40 leads therefrom to an orifice 41. As shown, this is above the valve 20. A duct 61 leads from the orifice 41 to the ducts 41' and 42', which lead to the meters 42 and 62. The meter 42 is a direct reading meter of any suitable form, and the small flow passes through this meter through the duct 43 into the duct 29, through the openings therein and the sleeve 31 into the main below the main valve. The other end 24 of the lever is pivotally connected at 25 to a link 26 which in turn is pivotally connected at 27' to a piston 44, which acts as a dash pot in the chamber 45 and is adapted to be reciprocated in the chamber, which is provided with the opening 46 for the admission of air to the dash pot. The object of this apparatus is to offer a resistance to the movement of the main valve, and while we have shown the well known dash pot arrangement, it will be apparent that we may employ any convenient device for this purpose.

One of the objects which we aim to realize and which is effected by the form of apparatus shown, is the creation of a change in pressure on the end of the arm 24 when the pressure in the main is changed. As the piston is drawn downward in its chamber, it will be seen that the end of the link 26 will be moved away from the axis about which the arm 24 rotates, thus increasing the couple at the end, whereas as the valve 20 swings outward, the pressure on the face of the valve will be decreased, thus decreasing the pressure at that end. It will also be seen that in the arrangement of the apparatus shown, the main valve will be entirely removed from the main course of the fluid, when it is open, and even in intermediate conditions, the position of the valve will be such that foreign matter passing therethrough will strike the valve at an angle, and be deflected therefrom, so that nothing will be caught by the valve during an extraordinary emergency flow. Means are provided for the increase of pressure in the main at the orifice 60, and in the form shown we employ an enlargement 50, though we contemplate the use of any device suitable for this purpose. At the point of maximum expansion of enlargement we form an annular chamber 51 in the mouth of which a screen 52 is placed. This chamber communicates with the duct 40, so that all foreign substances are kept out by the screen.

The meter shown at 62 is a proportional meter of any well known form, suitable for the purpose, and is connected by a duct 42' with the duct 61 and by a duct 52 with the duct 29.

The apparatus and the functions thereof may be best understood from the description of the operation which is as follows: Assuming a small flow from the source 8 through the main to the supply pipe 11, this flow entering at 15, will pass through the duct 40, 41', the direct reading meter 42, the duct 43, into one end of the duct 29, out through the opening therein, through the opening in the sleeve 31, into the chamber 21, out at 16 and to its destination, through 14. A pressure, of course, will be exerted against the face 70 of the main valve, but this will not be sufficient to overcome the effect of the dash pot 44. Now assume that there is a demand, perhaps a sudden demand, for a large supply of water; under these circumstances the pressure at 16 will drop, so that the pressure upon the bottom of the piston 44 and on the back of the valve 20 is decreased. In consequence, the main valve 20 begins to move and allows water to pass through the main at this point. As the main valve moves, the openings on one side of the partition 32 which have heretofore been open begin to close, whereas those on the other side which have hitherto been closed begin to open, so that during the change in position of the main valve from the full line to the dotted line position shown in Fig. 4, both meters will be registering. When the main valve reaches its full opening position shown in dotted lines, the openings in the sleeves 29 and 31 which control the passage through the direct meter will be entirely closed, and the other openings entirely open, so that now only the proportional meter will be reading, since there is no flow through the direct path. The path through the proportional meter carries a stream which is some known proportion of that which passes through the main, with a result that an accurate reading is given. We have found that a more reliable reading is given if the pressure in the main is increased at the orifice of the path which leads through the proportional meter and as shown we have increased the diameter of the main at that point for this purpose, preferably using an enlargement. We have found that the best proportion between the cross section of the main at this orifice and the cross section at the valve is 8 to 3, though we do not wish to be limited to this, but may employ diameters at these points which shall insure any suitable relation of cross-sectional areas. We prefer to arrange the parts so that one will exactly compensate for the other, and the couple exerted on the valve will be substantially constant through its movement, but the invention is not limited to such an arrangement. When the large demand ceases and the main is closed or practically closed below the box 13, the water backs up in the pipe 14, now exerting a strong pressure against the bottom of the piston 44 which will close the valve 20, the system thus being restored.

It will be understood that any suitable means may be used for providing the couple employed in the device, and that any form of valve or circuit controller may be employed which is suitable for the purpose, and within the scope of the claims. It will also be obvious to those skilled in the art, that numerous and extensive departures from the forms and details here shown may be made without departing from the spirit of this invention, the same being shown solely for the purpose of clearly illustrating one specific embodiment of the invention.

We claim:

1. In a device of the class described, the combination of a fluid main, said main, being of greater cross section at one point than at another, a source of pressure associated with said main, a normally partially closed main valve in said main, a path being provided for fluid around said valve adapted to conduct the small flow through said main, a meter for measuring the fluid flowing through said path, said main valve controlling said path to close the same as the main valve opens, a second path being provided around said valve, said second path being normally partially closed and being controlled by said main valve, and opened thereby in proportion as said main valve opens, and a meter for measuring the proportional flow through said second path.

2. In a device of the class described, a fluid main, a normally partially closed main valve in said main, a path being provided for fluid communicating with said main adapted to convey the small flow of said main around said main valve, said main being expanded where said path communicates with it, a meter for measuring the fluid flowing through said path, said main valve controlling said path to close the same as the main valve opens, a second path being provided around said valve, said second path being normally partially closed, and controlled by said main valve and opened thereby in proportion as the main valve opens, and a meter for measuring the proportional flow through said second path.

3. In combination, a fluid main, a source of pressure associated therewith, a main valve in said main, a plurality of paths being provided around said main valve, said main being enlarged where said paths are connected thereto, said paths being connected to the main where the enlargement is greatest, a meter in each path, and means controlled by said main valve governing the flow through said paths, one of said paths being opened by said main valve as another is closed.

4. In combination, a fluid main, a source of pressure associated therewith there being an enlargement in said main, a main valve controlling the flow of fluid through said main, a path being provided communicating with said main at the point of greatest enlargement, and shunting said main valve, a meter in said path, and means controlled by said main valve governing the flow through said path.

5. In combination, a fluid main having an orifice therein, a source of pressure associated therewith, there being an enlargement in said main, a main valve controlling the flow through the orifice in said main, a plurality of ducts leading around said orifice, said ducts being connected to said enlargement, meters in said ducts, and means controlled by said main valve governing the flow through said paths, one of said paths being opened by said main valve as another is closed.

6. In a device of the class described, the combination of a fluid main, a source of pressure associated therewith, there being an enlargement in said main, a main valve beyond said enlargement, a duct connected at one end to said enlargement where it is a maximum extending around said main valve and reëntering said main beyond said main valve, a meter in said duct and a second valve in said duct controlled by said main valve.

7. In a device of the class described, the combination of a fluid main, a section of said main being formed by two frusto-conical shaped parts placed base to base, a main valve in said main, a fluid duct connected with said main in such section and shunting said main valve, a meter in said duct and a valve in said duct controlled by said main valve.

8. In a device of the class described, the combination of a fluid main, there being an enlargement in said main, the most expanded portion of said enlargement bearing to the section of the main the ratio 8 to 3, a fluid duct connected to the most expanded portion of the enlargement, and shunting said main valve, a meter in said duct and a valve in said duct controlled by said main valve.

9. In a device of the class described, the combination of a main, there being an enlargement in said main, walls forming an annular chamber in the side of said enlargement, a main valve controlling the flow of fluid through said main, a fluid duct communicating with said chamber, a meter in said duct, and a valve in said duct controlled by said main valve.

10. In a device of the class described, the combination of a fluid main, sources of pressure associated therewith, there being an enlargement in said main, walls forming an annular chamber in the side of said enlargement, a screen in the mouth of said chamber, a main valve controlling the flow of fluid through said main, a fluid duct communicating with said chamber at one end, and with said main on the other side of said main valve at the other end, a meter in said duct, and a valve in said duct controlled by said main valve.

11. In a device of the class described, the combination of a fluid main having an orifice therein, a source of pressure associated therewith, a main valve controlling the flow of fluid in said main through said orifice, a plurality of paths being provided around said orifice, there being a difference in area adjacent the mouths of said paths to increase the pressure in the mouths of said paths as said main valve is opened, and a meter in one of said paths.

12. In a device of the class described, the combination of a fluid main, a source of pressure associated therewith, a main valve controlling said main, a plurality of paths being provided around said main valve, there being a difference in area adjacent the mouths of said paths to increase the pressure in the main at the mouths of said paths when said main valve is opened, meters in said paths, and means whereby said main valve controls the flow of fluid in said paths.

13. In combination, a fluid main having an orifice therein, sources of pressure associated therewith, a main valve in said main between said sources of pressure, paths around said orifice, there being a difference in area adjacent the mouths of said paths for increasing the pressure in the main at the mouths of said paths, a meter in each path, and a means controlled by said main valve governing the flow through said paths.

14. In combination, a fluid main having an orifice therein, sources of pressure associated therewith, a main valve in said main between said sources of pressure controlling said orifice, a path being provided around said orifice, there being a difference in area adjacent the mouths of said paths for increasing the pressure in said main at the mouth of said path as said valve opens, a proportional meter in said path, and means controlled by said main valve governing the flow through said path.

15. In combination, a fluid main having an orifice therein, sources of pressure associated therewith, a main valve, controlling said orifice, normally in the line of direct flow through the main but adapted to be moved to one side out of the path of the main flow of fluid through said main whereby when the valve is opened the main flow is unobstructed, a path being provided around said orifice, a proportional meter in said path and means controlled by said main valve governing the flow through said path.

16. In combination, a fluid main, sources of pressure associated therewith, a main valve in said main normally partially closing the same, said valve adapted to be moved out of said main when operated, a plurality of paths being provided around said main valve, meters in said paths and valves controlled by said main valve governing the flow of fluid through said paths.

17. In combination, a fluid main, sources of pressure associated therewith, a main valve in said main normally partially closing the same, said valve adapted to be moved out of said main when operated, a plurality of paths being provided around said main valve, meters in said paths and valves of the rotary type controlled by said main valve governing the flow of fluid through said paths.

18. In combination, a fluid main, sources of pressure associated therewith, a main valve normally in said main and controlling the flow of fluid through said main, said valve adapted to be moved from the main path of the flow through said main as said valve is opened, a plurality of paths being provided around said valve, meters in said paths and valves controlled by said main valve governing the flow of fluid through said paths.

19. In combination, a fluid main, sources of pressure associated therewith, a main valve in said main, a pivot for said valve outside of the main path of the flow through said main, an arm connecting said valve to said pivot, walls forming a chamber into which said valve is moved when opened, a path being provided for fluid around said valve, a meter in said path, and means controlled by said main valve governing the flow of fluid through said path.

20. In combination, a fluid main, a valve in said fluid main, a pivot for said valve to one side of the main path of flow through said main, an arm connecting said valve to said pivot, a dash pot, a piston in said dash pot, a link connecting said piston to said arm, a path being provided around said valve, means to meter the fluid flowing through said path, and means governed by said valve for controlling the flow of fluid through said path.

21. In combination, a fluid main, sources of fluid pressure associated with said main, a main valve in said fluid main between sources of pressure, said main valve being normally closed, and when opened, being moved outside the main path of flow through said main, a path being provided around said valve for conducting the normal flow through said main, a meter in said path for measuring the flow therethrough, a valve governing the said path controlled by said main valve, said valve being closed by said main valve as said main valve opens, a second path being provided around said valve normally closed, a second valve in said second path governing the flow therethrough, controlled by said main valve, and opened as said main valve is opened, means whereby the flow of fluid through said second path is proportional to the flow through the main valve, and a proportional meter for measuring the flow through the second path.

22. In a device of the class described, the combination of a fluid main, a main valve in said main, means creating a path around said main valve, the section of the main approaching the main valve having an orifice therein, a portion of the main approaching said orifice being uniformly expanded to a maximum at the orifice and a second valve in said path and means whereby said last named valve is controlled by the main valve.

23. In a device of the class described, the combination of a fluid main, a main valve controlling the flow therethrough, means creating a path around said main valve, the main being expanded at the intake of said path and being contracted uniformly from the intake to the position of control of the main valve and a second valve in such path and means whereby said last named valve is controlled by the main valve.

24. In a device of the class described the combination of a fluid main, a main valve, and means subjected to variations in pressure in said main influencing the operation of said main valve, said means operating to offer increasing resistance as the valve opens.

In testimony whereof, we hereunto affix our signatures in the presence of two witnesses, this 23rd day of January 1912.

GEORGE GOODELL EARL.
ALBERT BALDWIN WOOD.

Witnesses:
C. ARTHUR BROWN,
G. MATHIS.